(12) United States Patent
Schorpp

(10) Patent No.: US 7,375,870 B2
(45) Date of Patent: May 20, 2008

(54) ENHANCEMENT ELECTRODE CONFIGURATION FOR ELECTRICALLY CONTROLLED LIGHT MODULATORS

(75) Inventor: Marcus Schorpp, Lempäälä (FI)

(73) Assignee: Nokia Corporation, Espoo (FI)

(*) Notice: Subject to any disclaimer, the term of this patent is extended or adjusted under 35 U.S.C. 154(b) by 255 days.

(21) Appl. No.: 10/517,946

(22) PCT Filed: Jun. 13, 2002

(86) PCT No.: PCT/FI02/00512
§ 371 (c)(1),
(2), (4) Date: Jun. 13, 2005

(87) PCT Pub. No.: WO03/107087
PCT Pub. Date: Dec. 24, 2003

(65) Prior Publication Data
US 2006/0152790 A1    Jul. 13, 2006

(51) Int. Cl.
G02F 1/07    (2006.01)
G02F 1/03    (2006.01)

(52) U.S. Cl. ............... 359/254; 359/242; 359/245; 359/252

(58) Field of Classification Search ............... 359/254
See application file for complete search history.

(56) References Cited

U.S. PATENT DOCUMENTS

| | | | |
|---|---|---|---|
| 4,626,920 A | * | 12/1986 | Glenn .................. 348/775 |
| 4,693,561 A | | 9/1987 | Ashley ................. 350/336 |
| 5,623,361 A | * | 4/1997 | Engle .................. 359/291 |
| 6,903,872 B2 | * | 6/2005 | Schrader .............. 359/572 |
| 2006/0261377 A1 | * | 11/2006 | Schorpp ............... 257/244 |

FOREIGN PATENT DOCUMENTS

| | | |
|---|---|---|
| EP | 0434139 A2 | 6/1991 |
| RU | 2 080 641 | 5/1997 |
| WO | WO 01/48531 A2 | 7/2001 |

OTHER PUBLICATIONS

"Characteristics of Multichannel Phase Reliefographic Light Modulators" by V.A. Alekhin, Optoelectronics, Instrumentation and Data Processing, vol. 1, 1990, pp. 41-46.

* cited by examiner

Primary Examiner—Jessica T Stultz
(74) Attorney, Agent, or Firm—Ware, Fressola, Van Der Sluys & Adolphson

(57) ABSTRACT

An electrically controlled light modulator device comprises at least one cell, where two deformable dielectric layers meet at an interface, at least one of said layers consisting of viscoelastic relief forming gel. A first support electrode structure and a second signal electrode structures are arranged on separate sides of the dielectric layers in order to create an electric field passing through said layers and in order to create surface reliefs on the viscoelastic gel layer. According to the invention, a third enhancement electrode structure is arranged in the proximity of the first signal electrode structure. Applying enhancement signal voltage between the enhancement electrode structure and the signal electrode structure concentrates locally the electric field passing through the two deformable dielectric layers and therefore enhances the amplitude of the deformation of the viscoelastic gel layer.

16 Claims, 7 Drawing Sheets

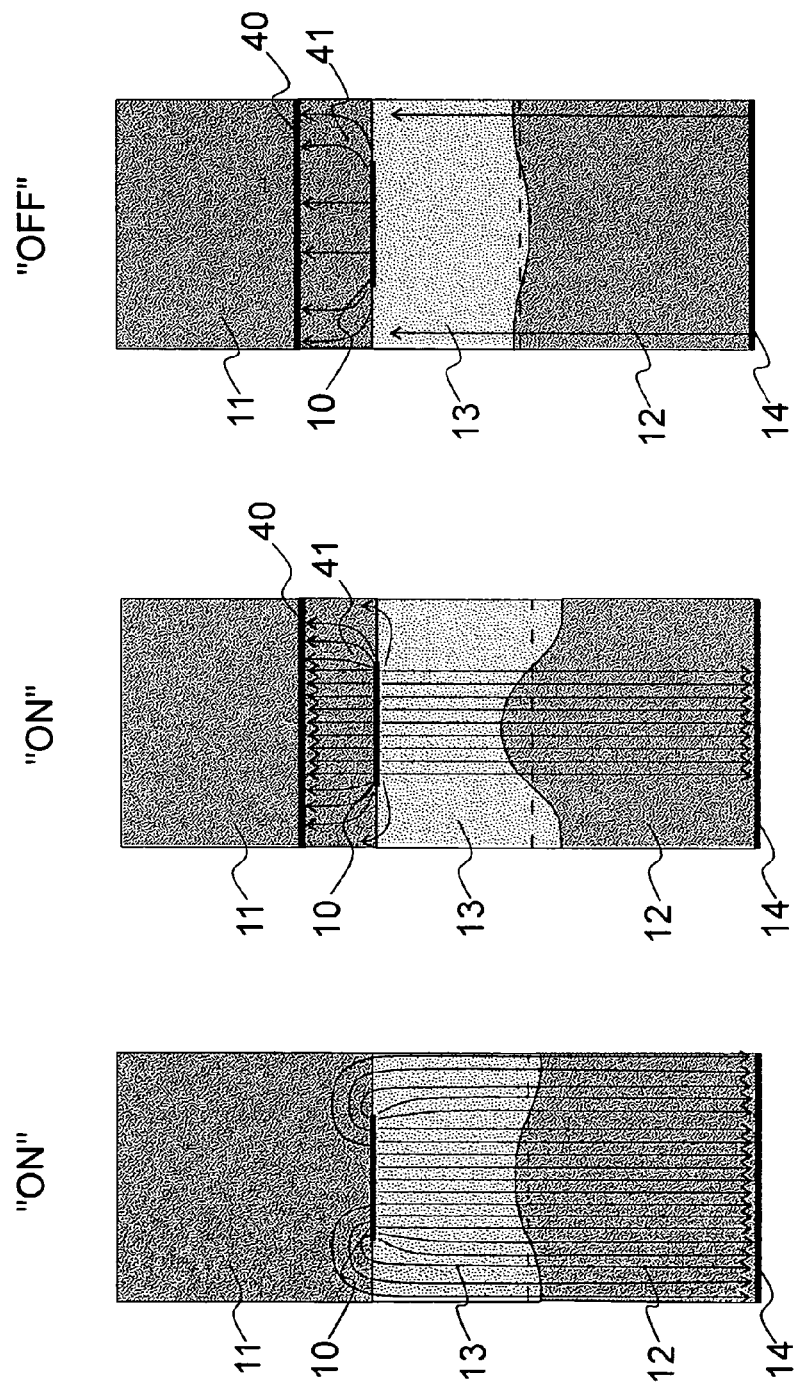

"ON"
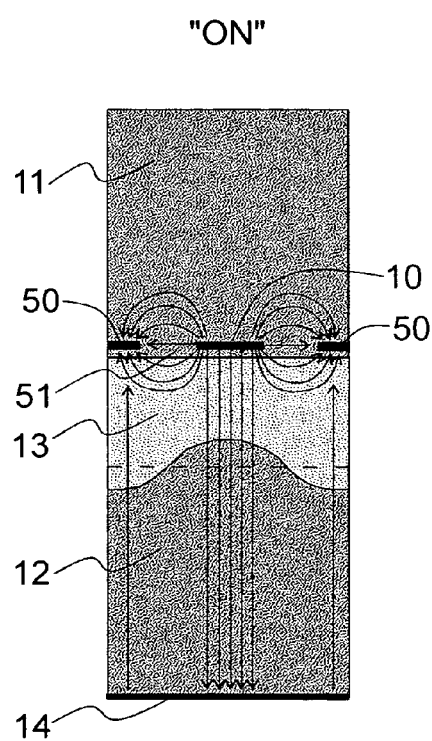
"OFF"
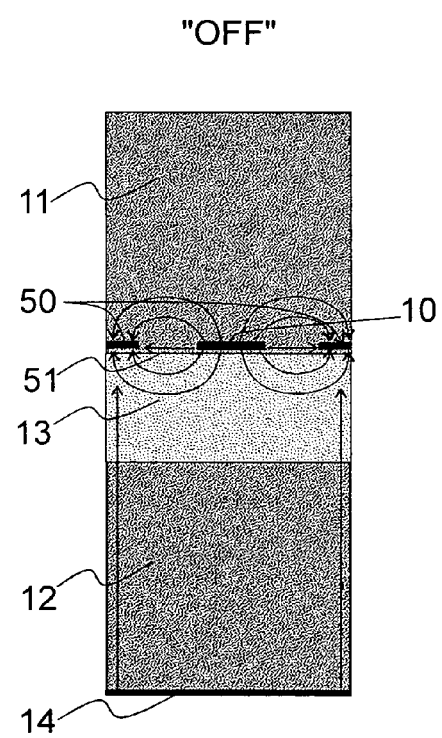
Fig. 6a
Fig. 6b

ENHANCEMENT ELECTRODE CONFIGURATION FOR ELECTRICALLY CONTROLLED LIGHT MODULATORS

CROSS-REFERENCE TO RELATED APPLICATION

This application is the U.S. National Stage of International Application Number PCT/FI02/00512 filed 13 Jun. 2002 and published in English on 24 Dec. 2003 under International Publication Number WO 03/107087A1.

FIELD OF THE INVENTION

The present invention relates to electrically controlled light modulator devices. The present invention relates also to display devices comprising a plurality of said electrically controlled light modulator devices.

BACKGROUND OF THE INVENTION

Document WO 01/48531 discloses a display panel structure (see especially FIGS. 49 to 55) in the form of an array of cells each of which comprises two deformable dielectric layers, which meet at a common interface. One of said dielectrics can be air; the other is preferably polymer material acting as a relief forming gel. For each cell a first electrode structure, a support electrode structure is arranged on one side (below) of said dielectric layers and a second electrode structure, a signal electrode structure on the other side (above) of said layers, there being means for providing signals to the signal electrodes in order to create electric fields through the two dielectric layers and to further create surface reliefs on the gel surface at the interface of said two dielectrics. The periodical, sinusoidally varying reliefs created on the gel surface in each of the cells allows under the effect of light from a light source to create images on the display panel, which are viewable by the naked eye.

FIG. 1 illustrates schematically the general principle of physics, which can be observed in connection with dielectric substances and which is also utilized in the aforementioned optical display device. Dielectric substance can be defined as a substance in which an electric field may be maintained with zero or near zero power dissipation, that is the electrical conductivity of the substance is zero or near zero. An electric field E going through an interface where dielectricity changes, such as the interface between air and polymer, causes a force F onto the surface of the dielectric having the higher dielectricity constant. This ponderomotive force F is proportional to the square of the electric field E at that point. In the case of an interface between air and polymer, the ponderomotive force F acts onto the polymer surface into the direction of the air.

The electric field generated between a support electrode and a signal electrode and penetrating through the interface of the two dielectrics within a light modulator cell is inhomogeneous over the polymer surface; the electric field is strongest directly under a signal electrode and weakest in the middle between two adjacent signal electrodes. This situation is valid for any practical dimensions of the light modulator cells and corresponding devices. Therefore, the force acting onto the polymer surface is inhomogeneous as well and a deformation of the polymer surface causing the surface to deviate from a flat plane can be observed. An optimum situation would be such that maximum ponderomotive force is reached directly under the center part of a signal electrode and correspondingly no force is applied in the middle between two adjacent signal electrodes. This would provide maximum height for the surface relief, because it allows the maximum flow of the polymer material towards the area where the electric field is strongest. The concept of polymer flow is essential here, since most polymers are substantially uncompressible and therefore cannot simply expand in volume under the effect of an electric field.

FIG. 2 clarifies the aforementioned prior art solution by showing two adjacent pixels (cells) L,R in a possible pixel line of a display panel or corresponding light modulator device. Each pixel comprises several strip like signal electrodes 10 arranged parallel respect to each other on a substrate 11, which may be for example glass. FIG. 2 shows an end view of the signal electrodes 10 thus revealing only the width and mutual distance between the electrodes 10. A dielectric and viscoelastic gel material 12, for example polymer, is applied onto a support electrode 14 and facing the signal electrodes 10. A gap 13, for example an air gap, is left between the surface of the viscoelastic layer 12 and the signal electrodes 10. The usually transparent support electrode 14 providing AC or DC potential is preferably made of indium tin oxide (ITO), as is known in the art, on the surface of a transparent front plate 15. The front plate 15 may be for example glass.

The light may enter the structure depicted in FIG. 2 either through the front plate 15 or through the substrate 11. The device can be designed to operate either in transmissive or reflective mode depending on the light transmitting or reflecting properties of the various elements of the device.

In FIG. 2 the left pixel L is switched on by providing suitable voltage to the respective signal electrodes 10, whereas the right pixel R is switched off, that is no signal is fed to the signal electrodes 10 belonging to said pixel R. Arrows 16 marked for the left pixel L illustrate schematically the ponderomotive forces acting on the surface of the gel layer 12. Through proper selection of the signal electrode 10 dimensions (width) and mutual positioning (distance between adjacent and parallel electrodes) a sinusoidal surface structure, a surface relief can be created on the polymer gel 12 surface. Illuminating light onto the sinusoidal gel 12 surface in pixel L through the front plate 15 or substrate 11 refracts light into a slightly different direction than illuminating a plane gel surface in pixel R. By this means and using an optical blocking filter for the pixel in off state, a pixel can be electrically switched on and off.

The major shortcomings of the light modulators, like the display panels described in WO 01/48531, which are based on electrically controlled deformation of dielectric and viscoelastic materials may be associated with the practical difficulties in producing desired profiles for the gel reliefs. This further impairs the light modulating capabilities of the devices, for example the capabilities of individual pixels or cells.

With the goal of bringing display quality closer to that of a paper print, for example brightness and contrast of the displays must be further improved. In order to allow the use of display devices in small-size portable devices, the power consumption and thickness of the display devices should also be further reduced. To make mass production of portable devices possible, the manufacturing technology of the display devices should be simple in order to allow lower prices. The displays should also be fast enough to be able to display video or similar fast changing image content without degration of the image quality. The aforementioned requirements also apply on other light modulator devices than display panels. Other applications which may be based on the use of electrically controlled deformation of dielectric and viscoelastic transparent materials include, but are not limited to, electrically controlled diffractive or refractive lenses, or electrically reconfigurable optical waveguide couplers.

SUMMARY OF THE INVENTION

The main purpose of the present invention is to present a novel electrode configuration for light modulator cells based on the use of dielectric and viscoelastic materials to facilitate enhanced and active deformation of viscoelastic material in order to, among other things, increase the diffraction efficiency of the light modulator cells, shorten the response time required to switch a cell (pixel) or corresponding primary optical unit between on and off states, and to reduce the voltage levels required for a defined diffraction amplitude, that is for a certain height of a gel relief. Therefore, the current invention aims to the manufacturing of light modulators with better optical contrast, higher switching speed and smaller power consumption than what can be provided by devices of prior art. The invention also allows the use of softer polymers once more increasing the diffraction amplitude of the gel relief with the named advantages.

The basic idea of the invention is to utilize active field-shaping enhancement electrode structure located in the proximity and in addition to the signal electrode structure of a cell in order to affect the electric field between the signal electrode structure and the support electrode structure and through the viscoelastic layer in a manner that the deformation amplitude of the viscoelastic layer in the cell is increased.

The invention has the following two principal embodiments: An in-plane-type enhancement electrode configuration and a sandwich-type enhancement electrode configuration.

In the in-plane-type configuration, the signal electrode structures and the enhancement electrode structures are located side by side substantially in a single common plane facing the opposite support electrode structure. This embodiment of the invention describes a quite strict configuration but on the other hand it is easy to manufacture.

In the sandwich-type configuration, the signal electrode structure and the enhancement electrode structure are located in different layers, that is in different planes respect to each other and respect to the opposite support electrode structure. In a preferred embodiment of the sandwich-type electrode configuration, a conductor plated glass substrate is used, where the whole conductor layer is utilized as an enhancement electrode. Onto this enhancement electrode layer, a thin dielectric insulation layer is further disposed and the signal electrodes are lithographically generated onto said dielectric insulation layer.

According to a first aspect of the present invention, there is an electrically controlled light modulator device comprising at least one cell, said cell comprising at least two deformable dielectric layers which meet at an interface, at least one of said layers consisting of viscoelastic relief forming gel, a first support electrode structure arranged on one side of the dielectric layers, a second signal electrode structure arranged on the other side of the dielectric layers and opposite to the support electrode structure, and signal means for applying signal voltage between the support and signal electrode structures to generate electric field passing through the two deformable dielectric layers in order to create surface reliefs on the viscoelastic gel layer, a third enhancement electrode structure composed of one or more separate electrode zones arranged in the proximity of the first signal electrode structure, and enhancement signal means for applying enhancement signal voltage between the enhancement electrode structure and the signal electrode structure in order to locally concentrate the electric field passing through the two deformable dielectric layers and therefore arranged to enhance the amplitude of the deformation of the viscoelastic gel layer.

According to a second aspect of the present invention, there is a display device comprising a plurality of electrically controlled light modulator devices, said light modulator devices comprising at least one cell, said cell comprising at least two deformable dielectric layers which meet at an interface, at least one of said layers consisting of viscoelastic relief forming gel, a first support electrode structure arranged on one side of the dielectric layers, a second signal electrode structure arranged on the other side of the dielectric layers and opposite to the support electrode structure, and signal means for applying signal voltage between the support and signal electrode structures to generate electric field passing through the two deformable dielectric layers in order to create surface reliefs on the viscoelastic gel layer, a third enhancement electrode structure composed of one or more separate electrode zones arranged in the proximity of the first signal electrode structure, and enhancement signal means for applying enhancement signal voltage between the enhancement electrode structure and the signal electrode structure in order to locally concentrate the electric field passing through the two deformable dielectric layers and therefore arranged to enhance the amplitude of the deformation of the viscoelastic gel layer.

The preferred embodiments of the invention and their benefits will become more apparent to a person skilled in the art through the description and examples given herein below, and also through the appended claims.

BRIEF DESCRIPTION OF THE DRAWINGS

In the following, the invention will be described in more detail with reference to the appended drawings, in which FIG. 3 illustrates schematically a single sub-cell according to the prior art, including illustrations of electric field lines, FIG. 4 illustrates schematically a single sub-cell according to the invention with sandwich-type enhancement electrode and the cell switched on, including illustrations of electric field lines FIG. 5 same as FIG. 4 but the cell switched off, FIG. 6*a* illustrates schematically a single sub-cell according to the invention with in-plane-type enhancement electrode and switched on, including illustrations of electric field lines FIG. 6*b* same as FIG. 6*a* but the cell switched off.

DETAILED DESCRIPTION OF THE INVENTION

In the following, the enhancement electrode configurations according to the invention are described in more detail and their benefits compared to the prior art solutions are pointed out using selected simulation results.

It should be noted that when the invention is applied to display devices, the concept of a cell corresponds closely to a single pixel of a display. However, the invention is not limited to display devices, but can be applied broadly also to other type of light modulators. Therefore, the term cell is mainly used in the following description.

Figure 1:
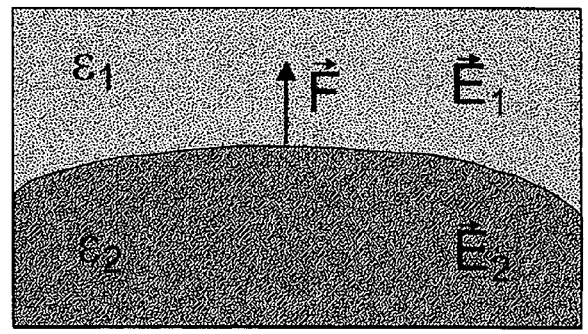
FIG. 1 illustrates schematically force F acting on an interface between substances having different dielectricity under the influence of an electric field.
Figure 2:
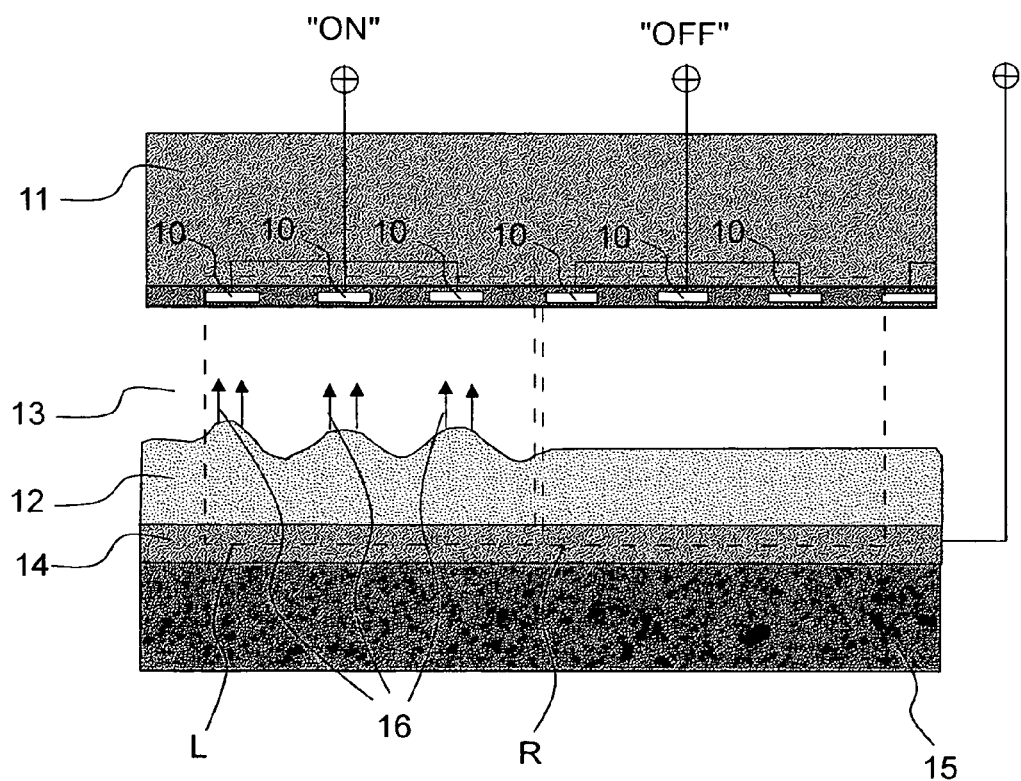
FIG. 2 illustrates schematically two adjacent pixels of a prior art display panel based on the use of electrically deformable dielectric viscoelastic gel.

FIGS. 3-5 illustrate schematically a single sub-cell cell structure used for the numerical computer simulations. The sub-cell comprises one signal electrode 10 plus half the spacing to the next adjacent signal electrode on each side. Therefore, a complete cell comprises in this example case all together three adjacent signal electrodes in a manner similar than presented in FIG. 2. A practical cell (or pixel) can comprise also more than two sub-cells, for example, 5 or more sub-cells. The numerical simulations were decided to be performed using half-sub-cells instead complete sub-cells for the obvious reasons that this significantly increases simulation speed and reduces computer memory requirements without losing any relevant information due to the center symmetry of the sub-cell.

Compared to FIG. 2, FIGS. 3-5 are simplified and show only the basic parts of the light modulator structure: support electrodes 14, polymer gel layer 12, air gap 13, signal electrode 10 and substrate material 11.

FIG. 3 corresponds in general manner to the solutions of prior art (FIG. 2), disclosed for example in WO 01/48531, and without the use of any active field enhancement electrodes. It can be seen that in this case when the signal electrode 10 is energized, the electric field illustrated with arrow-ended field lines spreads out from the area directly below the narrow signal electrode 10 due to the peripheral field (edge) effects, which take place in the area between the adjacent signal electrodes 10.

FIG. 4 shows the effect of a sandwich-type enhancement electrode 40 in a situation where the cell is switched on, that is the signal electrode 10 is energized. Now according to the invention, the enhancement electrode 40 arranged near to the signal electrode 10 changes the electric field between the signal electrode 10 and the support electrode 14. With the location and the potential of the enhancement electrode 40 chosen correctly, the electric field is altered in such a way that the electric field is concentrated directly below the signal electrode 10 and the peripheral effects outside the aforementioned area are reduced. This significantly increases the amplitude of the deformation of the gel layer 12 compared to the situation illustrated in FIG. 3. In order to allow the signal electrode 10 and the enhancement electrode 40 to be arranged in different potentials, the enhancement electrode plane above the signal electrode plane is separated by a thin dielectric insulator layer 41, which maybe, for example, an $Al_2O_3$ or $SiO_2$ layer.

FIGS. 6*a* and 6*b* show schematically an in-plane-type enhancement electrode configuration in on and off states, respectively. According to the simulations, the in-plane-type configuration of the enhancement electrodes increases the efficiency of deformation nearly equally compared to the sandwich-type configuration shown in FIGS. 4 and 5. In FIGS. 6*a* and 6*b* showing a sub-cell, the enhancement electrodes 50 are arranged parallel on both sides of the signal electrode 10 in a common plane. In other words an active enhancement electrode 50 is located in between every two adjacent signal electrodes 10. To avoid electrical breakthrough between the signal- and enhancement electrodes they are covered with a thin dielectric insulator layer 51, since without such insulation said electrodes 10,50 would face directly the air of the air gap 13 and thus experience a low break-through voltage.

According to the invention, the enhancement electrodes 40,50 do not need to be on ground potential. Simulations have showed that for the sandwich- and in-plane-type enhancement electrode configurations, a slightly negative potential is optimum for the enhancement electrodes 40,50 when the support electrode 14 is on ground potential and the signal electrodes 10 run at some tens to hundreds of volts.

A very significant increase in the polymer layer 12 deformation efficiency, that is higher deformation amplitudes can be expected through the use of the enhancement electrodes 40,50. According to some simulation results the polymer layer 12 amplitude may be increased by a factor 6.5 without changing any other parameters expect the addition of the enhancement electrodes 40, 50. It is important to notice that this efficiency increase is achieved without changing the voltage between the signal electrode 10 and the support electrodes 14.

To achieve a reasonable optical contrast between a light modulator cell being switched on and a light modulator cell being switched off, a defined minimum deformation (diffraction) amplitude for the polymer layer 12 is necessary. This minimum diffraction amplitude depends on several parameters of which one is the signal electrode 10 voltage. Since the invention creates significantly larger diffraction amplitudes at the same signal electrode voltage, the voltage may now be reduced to produce the same minimum diffraction amplitude needed for a working light modulator cell. Hence, because smaller voltage amplitudes can be created faster than large ones (limiting parameter V/µs), increased switch-on speed of the light modulator can be observed together with smaller power consumption. The effect of the enhancement electrodes 40,50 can be understood best through the concept of electric field concentration. Due to the electric field concentration, only the polymer 12 in areas of strong electric field, that is directly below signal electrode 10 is drawn towards the air gap 13. At the same time the force onto the polymer 12 surface in the adjacent areas, that is areas not below the signal electrode 10, is reduced. Since the polymer material 12 is substantially incompressible, a polymer flow from the aforementioned areas of weak electric field to the areas of strong electric field takes place, and correspondingly significantly higher polymer layer 12 deformation amplitude can be seen. Without the enhancement electrodes 40,50, the electric field dynamics are much smaller; the polymer 12 remains under stress also at the sub-cell sides, hindering it from flowing freely to the area below the signal electrode 10.

In the following, some simulations results for in-plane-type enhancement electrodes are presented in order to compare their performance with the solutions of prior art.

Figure 7:
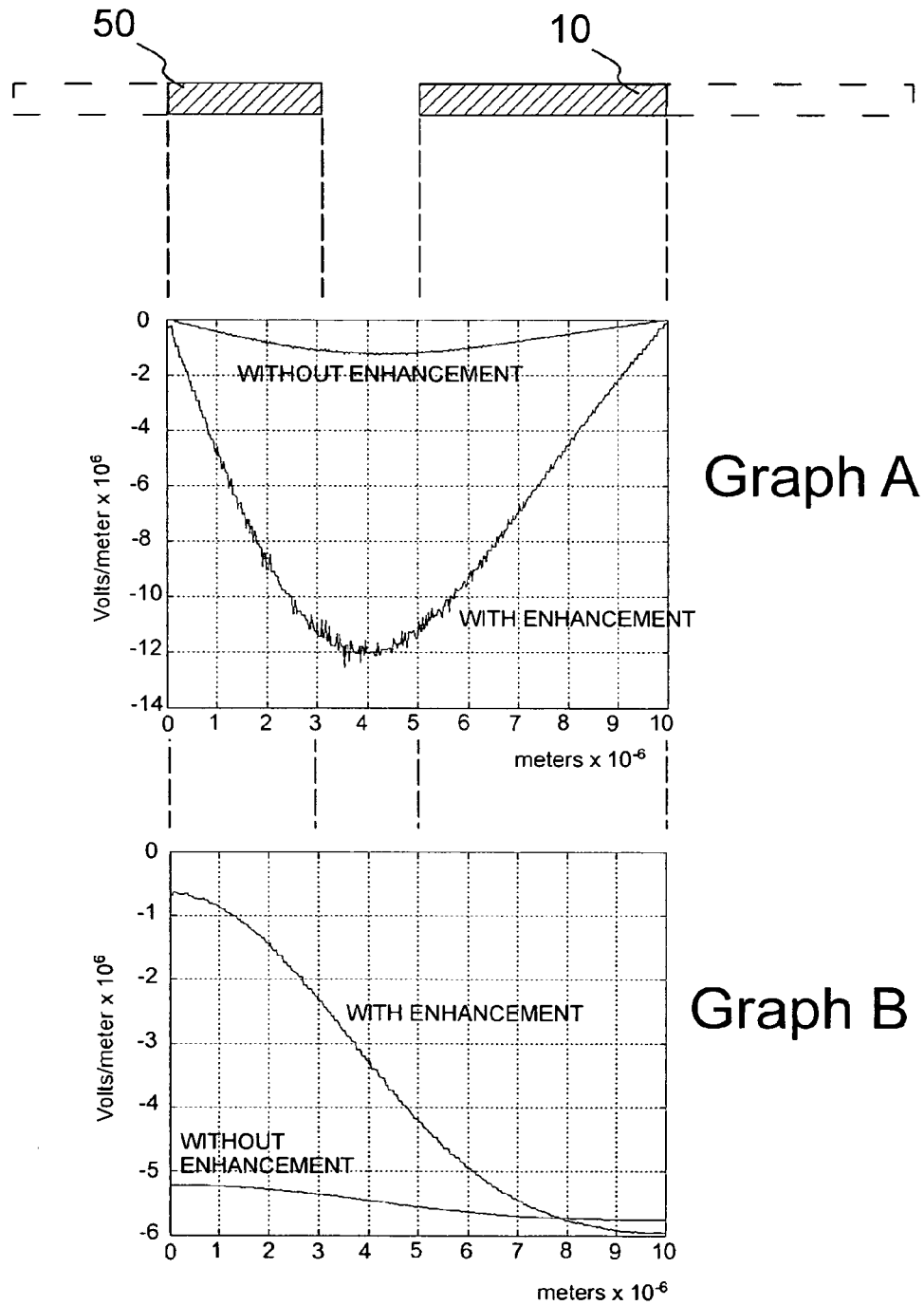
FIG. 7 presents simulation results comparing the horizontal (Graph A) and the vertical (Graph B) electric field strengths above the polymer surface in an in-plane-type enhancement electrode implementation and in a prior art type solution.

FIG. 7 shows horizontal ($E_x$-field, Graph A) and vertical ($E_y$-field, Graph B) electric fields 250 nm above the polymer-air interface 12,13 of an in-plane enhancement electrode implementation shown schematically in FIGS. 6a, 6a. In FIG. 7 half of the 10 µm wide signal electrode 10 is located at the right side of the graphs from x=5 to x=10 and half of the 6 µm wide enhancement electrode 50 is in plane with the signal electrode 10 and located on the left side of the graphs from location x=0 to x=3. The distance between the enhancement electrode 50 and the signal electrode 10 is 2 µm. FIG. 7 corresponds therefore to half of a sub-cell presented in FIGS. 6a, 6b. The horizontal $E_x$-field shown in Graph A is a magnitude smaller than the vertical $E_y$-field shown in Graph B. For comparison, FIG. 7 also includes electric fields corresponding a prior art situation, in other words without the enhancement electrodes.

Especially from Graph B in FIG. 7 showing the vertical $E_y$-field it is immediately clear that with the enhancement electrodes 50 the electric field is reduced at the sides of the sub-cell, that is outside the area directly below the signal electrode 10. Below the signal electrode 10, the field strength corresponds closely to the prior art situation without the enhancement electrodes. Keeping in mind that the forces acting onto the polymer 12 surface are proportional to the square of the electric field strength, it is clear that the deeper gradient in the electric field between the area directly below the signal electrode 10 (x=5-10) and outside that area (x=0-5) make a major difference in the polymer layer 12 behaviour. In the prior art situation without enhancement electrodes the polymer surface is under stress also beside (x=0-5) the signal electrodes 10, where it basically should be allowed to move freely downwards to compensate the polymer flow necessary for the upward movement below the signal electrodes 10. Since the polymer 12 cannot expand significantly in volume due to its incompressibility, the force onto the polymer 12 surface beside the signal electrodes 10 prohibits effectively said upward movement below the signal electrode 10. The enhancement electrodes 50 reduce significantly or remove almost completely the electric field beside the signal electrodes 10 and therefore allow the upward movement of the polymer 12 in the area directly below the signal electrodes 10. A higher deformation amplitude is resulted.

Figure 8:
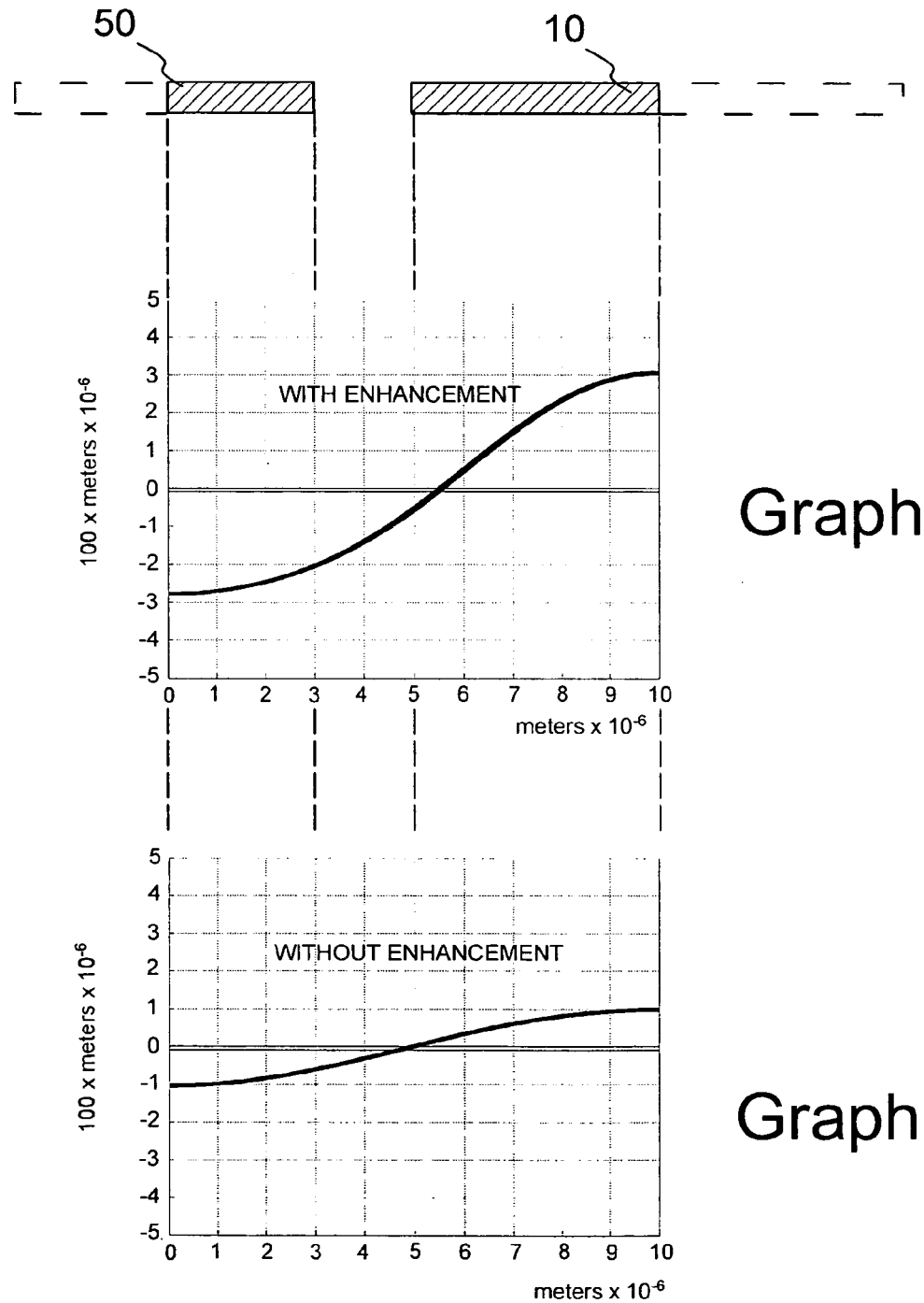
FIG. 8 presents a simulation result showing the polymer surface displacement in an in-plane-type enhancement electrode implementation (Graph A), and a comparable simulation result showing the polymer surface displacement in a prior art solution (Graph B), FIG. 9 defines abbreviations for the various dimensions of a sandwich-type cell configuration, FIG. 10 defines abbreviations for the various dimensions of a in-plane-type cell configuration.

FIG. 8 shows the displacement of the polymer 12 surface in manner similar than FIG. 7. Graph A in FIG. 8 describes the situation with in-plane-type enhancement electrodes 50 activated and Graph B in FIG. 8 corresponds to the prior art situation without enhancement electrodes. The displacement in y-axis in both figures is given in micrometers. In order to get a fair comparison between the invention and the prior art solution, similar voltage differences between signal- and support electrodes have been used. Therefore, in Graph A $V_{support}$=−150 V and $V_{signal}$=40 V and in Graph B $V_{support}$=−150 V and $V_{signal}$=40 V. The enhancement electrodes 50 in Graph A are provided with $V_{enhancement}$=−200 V. A slightly more negative potential for the enhancement electrodes 50 relative to the support electrode 14 improves performance. Other parameters are similar in both simulations.

It is evident from FIG. 8 that the use of enhancement electrodes according to the invention clearly provides a much higher deformation amplitude. A very important feature of the invention is that it provides possibility to use active off switching instead of relying only on the natural relaxation of the polymer layer 12 after deactivation of the signal electrodes 10. This is a major difference compared to any prior art solutions, because it allows the use of softer polymer materials in the deformable layer 12 instead of typical harder polymers in order to produce larger diffraction amplitudes or, alternatively, lower signal voltages for similar, "standard" diffraction amplitudes. Because the inner forces in a "soft" polymer are much smaller than in a "hard" polymer, the "soft" polymer relaxes much slower than a "hard" polymer, and in order to prevent degradation of the response times of the system, active off switching is necessary. One parameter describing the aforementioned softness/hardness of a polymer is the elastic modulus of the material.

The basic idea behind the active off switching according to the invention is the following: when the signal electrode 10 is switched off, the enhancement electrodes 40,50 are switched on for a short period of time until the polymer layer 12 just flattens out. This becomes possible because the electric field created by the enhancement electrodes especially in the in-plane-type configuration are located there, where the signal electrodes 10 create a polymer valley region. In other words, during on switching the polymer 12 beside the signal electrodes 10 was drawn to the area directly below the signal electrodes 10 in order to generate the diffraction peak. Naturally, this leaves a valley in the polymer layer 12 beside the signal electrodes 10, and for example in FIG. 6 directly under the in-plane-type enhancement electrodes 50. Now, during off switching if the enhancement electrodes 50 are provided for a short time with a suitable (high) voltage, this pulls actively the missing polymer back to fill up that valley, which results in an actively flattened polymer surface; the optical cell (pixel) is switched off much faster than through its natural slow relaxation due to the internal forces of the polymer.

Active off switching in the case of the sandwich-type enhancement electrode configuration is illustrated in FIG. 5, where the pulling of the polymer layer 12 upwards beside the signal electrode 10 is somewhat exaggerated for demonstration purposes.

To shortly summarize the main aspects of the current invention, the invention proposes a novel and inventive use of active enhancement electrodes, which provide at least the following significant benefits over prior art:

Higher efficiency: Smaller signal voltage levels are required to achieve required diffractive amplitude levels, that is amplitudes of viscoelastic layer deformations. Correspondingly, "standard" voltage levels may be used to achieve increased diffractive amplitudes.

Increased response time: The enhancement electrodes 40,50 may be used for active switching off to increase the switch-off speed of the light modulator cell. Since slow relaxation of the viscoelastic material is usually a limiting factor in choosing the suitable polymer material, active switching off allows using softer polymers. Softer polymers provide better efficiency in respect to diffraction amplitude. Respectively, lower signal voltages may be used to gain the same diffraction amplitude compared to a system without active switching off, where a harder and therefore a faster relaxing polymer has to be used to fulfil the necessary speed requirements. Additionally, lower signal voltage levels also result in increased switch-on speed, since another important limiting factor in the realization of the components is the technology-limited voltage rise time (voltage×time=constant). Therefore, reducing the signal voltage maximum level directly reduces the switch-on time, which results in a faster working system.

While the invention has been shown and described above with respect to selected embodiments, it should be understood that these embodiments are only examples and that a person skilled in the art could construct other embodiments utilizing technical details other than those specifically disclosed herein while still remaining within the spirit and scope of the present invention. It should therefore be understood that various omissions and substitutions and changes in the form and detail of the light modulator illustrated, as well as in the operation of the same, may be made by those skilled in the art without departing from the spirit of the invention. It is the intention, therefore, to restrict the invention only in the manner indicated by the scope of the claims appended hereto.

For example, the embodiments of the invention can be extended to devices where the air gap 13 is replaced with a gap formed from some other suitable gas or vacuum or other deformable polymer. Suitable dielectric and viscoelastic materials 12 include, for example, silicone gel, oil, various polymer materials or other viscous substances that have a tendency to deform when placed in a presence of an electric field, and said materials relax towards their original form or shape after the aforementioned effect ceases.

The transparent electrode structures may be made of indium tin oxide (ITO), as is known in the art, or other methods for creating substantially transparent electrode structures on any substantially transparent substrate material can also be employed without departing from the scope of the present invention. If the device is designed to be used in reflection, or the electrode structures are designed to be small enough to cause only minor light blockage, it is also possible to use non-transparent electrode systems for the various electrodes.

Within a single light modulator cell or corresponding primary optical unit the support electrode structure, the signal electrode structure and also the enhancement electrode structure may be each composed of one or more separate electrode zones.

Optimization parameters that may be selected according to the specific application, for a given signal electrode structure, include for example the number and width of the enhancement electrodes 40,50, the distance between the enhancement electrodes 40,50 and the signal electrodes 10. The enhancement electrode 40,50 voltage also is a parameter for optimization depending on voltage applied to the signal electrodes 10 and support electrodes 14.

The sandwich-type implementation shown schematically in FIGS. 4 and 5 may use a conductor plated glass substrate 11, where the whole conductor layer is used as an enhancement electrode 40. Onto the enhancement electrode layer 40, a thin dielectric insulation layer 41 is disposed. Onto the dielectric insulation layer 41, the signal electrodes 10 are lithographically generated. No further insulation layers are needed to prevent electric break-through between said electrodes. Optimization parameters here include the thickness of the dielectric insulation layer 11, and as above, the voltage level of the enhancement electrode 40

For the in-plane-type implementation shown schematically in FIGS. 6a, 6b, the signal 10 and enhancement electrodes 50 may be lithographically generated on a conductor plated glass substrate 11. A dielectric insulation layer 51 is disposed onto the electrodes 10,50. Only small openings through the dielectric insulation layer 51 need to be arranged for contacting electrically said electrodes 10,50.

Figure 9:
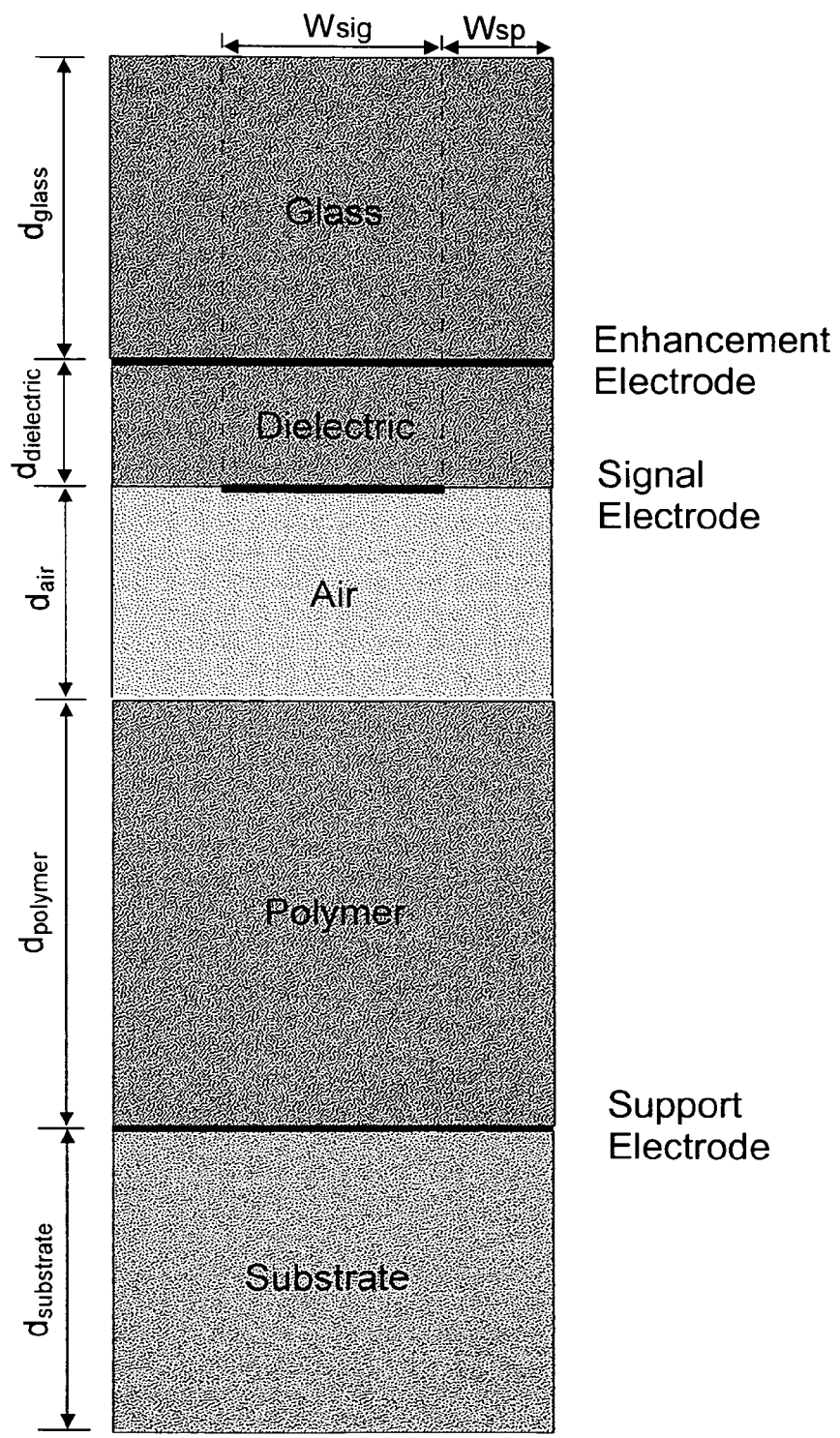
Figure 10:
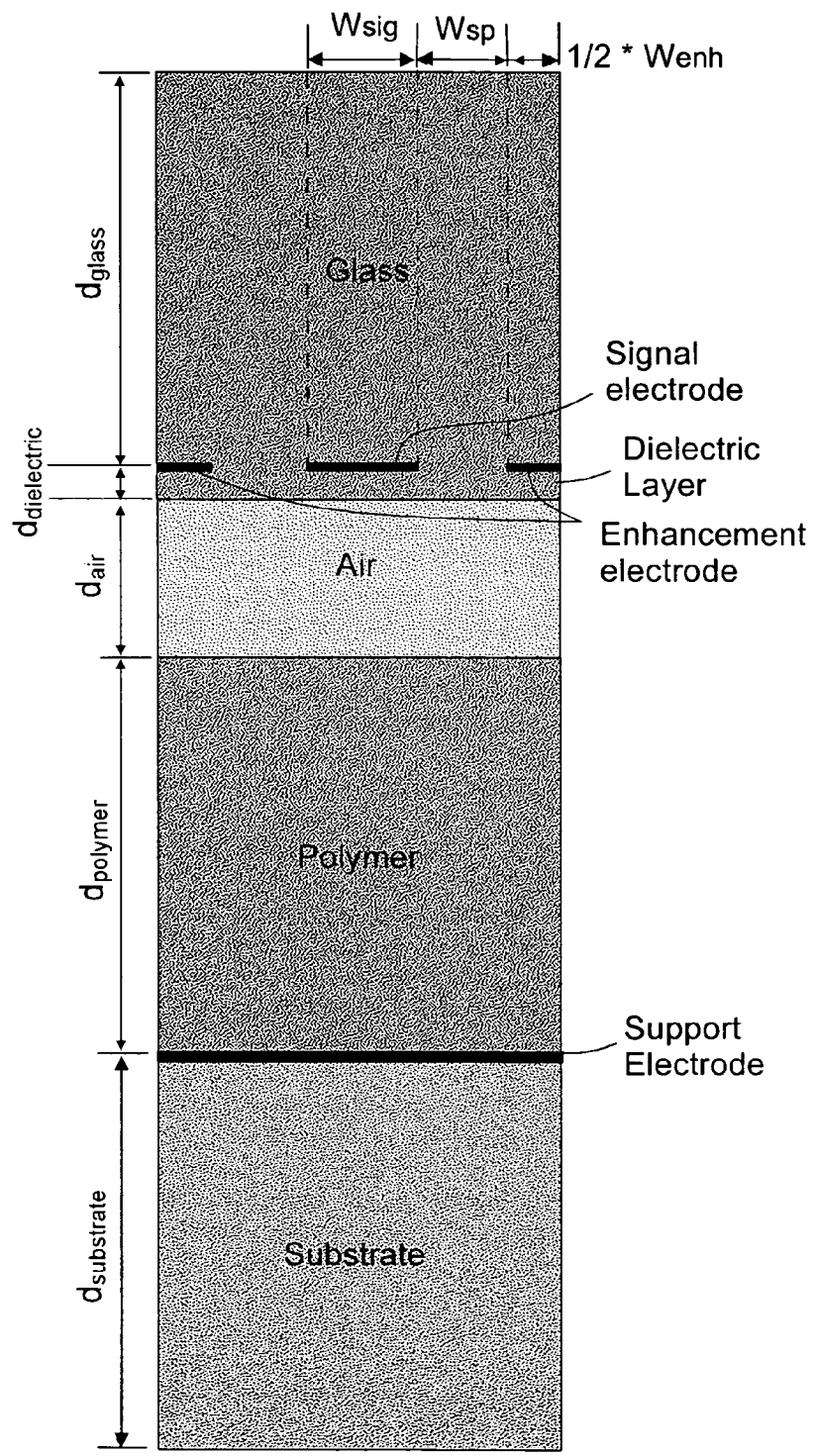

In table 1 selected examples of typical dimensions of the various structures in the enhancement electrode cells are given with reference to FIGS. 9 and 10. FIG. 9 corresponds to a sandwich-type configuration and FIG. 10 to an in-plane-type configuration.

A typical number of sub-cells per pixel/cell depends on the application. For example, in case of a micro display one pixel (cell) could have dimensions 200 μm×200 μm. This would lead to a construction with 5-50 sub-cells per pixel.

The signal, support and enhancement electrode voltages depend on the mechanical dimensions of the cells as well as on the properties of the material of the viscoelastic layer. Table 2 gives certain voltage levels that can be regarded as target voltages for a micro display application.

TABLE 1

Typical dimensions.

| Dimensions | Abbreviation | Typical Size Sandwich | Typical Size In-Plane |
|---|---|---|---|
| Airgap | $d_{air}$ | 3 . . . 5 μm | 3 . . . 5 μm |
| Polymer thickness | $d_{polymer}$ | 5 . . . 25 μm | 5 . . . 25 μm |
| Topglass | $d_{glass}$ | 1 mm | 1 mm |
| Substrate | $d_{substrate}$ | 2.3 mm | 2.3 mm |
| Signal electrode width | $w_{sig}$ | 2 . . . 20 μm | 2 . . . 20 μm |
| Enhancement electrode width | $w_{enh}$ | Pixel width | 3 . . . 5 μm |
| Electrode distance | $w_{sp}$ | X | 2 μm |

TABLE 2

Typical voltages.

| Signal name | Voltage OFF | Voltage ON |
|---|---|---|
| Signal | 0 V | 10 . . . 15 V |
| Enhancement | −60 . . . −80 V | −40 . . . −20 V |
| Support | −80 V | −80 V |

It is obvious for a person skilled in the art that the operation of the optical devices according to the invention on some applications rely on optical interference, and thus require a certain degree of coherence and/or collimation of the optical signal/beam that is being processed.

The electrically controlled light modulator and the various applications utilizing the same may be used for many types of optical switching purposes. The devices according to the invention can be used, for example, in display panels, electrically controlled lens elements or electrically reconfigurable optical couplers. The last mentioned devices might be used to switch or divide optical signal between several alternative targets, said targets being for example optical waveguides.

The invention claimed is:
1. A device comprising at least
an interface between a first deformable dielectric layer and a second deformable dielectric layer, said first layer consisting of a viscoelastic relief forming material,
a first electrode structure, a second electrode structure opposing said first electrode structure such that said layers are located between said first electrode structure and said second electrode structure, a signal supplier for applying a signal voltage between said first and second electrode structures to generate an electric field passing through said layers in order to create a surface relief in said first layer, an enhancement electrode structure arranged in the proximity of said second electrode structure, and an enhancement signal supplier arranged to apply a pulsed enhancement signal voltage between said enhancement electrode structure and said second electrode structure during flattening of said surface relief in order to enhance relaxation of said first layer.

2. The device according to claim 1, wherein said enhancement electrode structure and said second electrode structure are located substantially in a single common plane.

3. The device according to claim 2, wherein a zone of said second electrode structure is located between at least two zones of said enhancement electrode structure.

4. The device according to claim 1, wherein said enhancement electrode structure and said second electrode structure are in substantially different planes with respect to each other and with respect to said first electrode structure.

5. The device according to claim 1, wherein the voltage of said enhancement electrode structure is arranged to be negative with respect to the voltage of said first electrode structure.

6. The device according to claim 1, wherein said enhancement electrode structure is opaque.

7. The device according to claim 1, wherein said enhancement electrode structure is an optically transparent structure formed of indium tin oxide.

8. The device according to claim 1, wherein an electrically insulating layer is arranged on one or both sides of said enhancement electrode structure.

9. The device according to claim 1, wherein said viscoelastic material is selected from the following group: polymer silicone compound, oil.

10. A display device comprising a plurality of light modulating cells, each cell in turn comprising:
  an interface between a first deformable dielectric layer and a second deformable dielectric layer, said first layer consisting of a viscoelastic relief forming material,
  a first electrode structure,
  a second electrode structure opposite said first electrode structure such that said layers are located between said first electrode structure and second electrode structure,
  a signal supplier for applying a signal voltage between said first and second electrode structures to generate an electric field passing through said layers in order to create a surface relief on said first layer,
  an enhancement electrode structure arranged in the proximity of said second electrode structure, and
  an enhancement signal supplier arranged to apply a pulsed enhancement signal voltage between said enhancement electrode structure and said second electrode structure during flattening of said surface relief in order to enhance relaxation of said first layer.

11. The device according to claim 10, wherein within a cell said enhancement electrode structure and said second electrode structure are located substantially in a single common plane.

12. The device according to claim 11, wherein within a cell a zone of said second electrode structure is located between at least two zones of said enhancement electrode structure.

13. The device according to claim 10 wherein within a cell said enhancement electrode structure and said second electrode structure are located in substantially different planes with respect to each other and with respect to said first electrode.

14. The device according to claim 10, wherein said enhancement electrode structure is an optically transparent structure formed of indium tin oxide.

15. A method for creating and flattening a relief in a viscoelastic material layer by using a first electrode structure, a second electrode structure opposite said first electrode structure, an interface between a first deformable dielectric layer and a second deformable dielectric layer, said layers being arranged between said first and second electrode structures, said first deformable dielectric layer consisting of a viscoelastic relief-forming material, and an enhancement electrode structure arranged in the proximity of said second electrode structure, said method comprising:
  applying a signal voltage between said first and said second electrode structure to generate an electric field passing through said layers in order to create a surface relief on said viscoelastic material, and
  applying a pulsed enhancement voltage between said second electrode structure and said enhancement electrode structure during flattening of said relief in order to enhance relaxation of said first layer.

16. The method of claim 15, further comprising modulating light by using said relief.

* * * * *

UNITED STATES PATENT AND TRADEMARK OFFICE
CERTIFICATE OF CORRECTION

PATENT NO. : 7,375,870 B2  Page 1 of 1
APPLICATION NO. : 10/517946
DATED : May 20, 2008
INVENTOR(S) : Schorpp It is certified that error appears in the above-identified patent and that said Letters Patent is hereby corrected as shown below:

On the Title page item (57), Abstract, line 5, "structures" should be -- structure --

Signed and Sealed this

Sixteenth Day of September, 2008

JON W. DUDAS
*Director of the United States Patent and Trademark Office*